(12) United States Patent
Naganawa

(10) Patent No.: US 9,721,538 B2
(45) Date of Patent: Aug. 1, 2017

(54) INFORMATION DISPLAY APPARATUS, INFORMATION DISPLAY SYSTEM, CONTROL METHOD THEREOF, AND PROGRAM

(71) Applicant: CANON KABUSHIKI KAISHA, Tokyo (JP)

(72) Inventor: Yoshihiro Naganawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 14/140,832

(22) Filed: Dec. 26, 2013

(65) Prior Publication Data

US 2014/0184641 A1  Jul. 3, 2014

(30) Foreign Application Priority Data

Dec. 29, 2012 (JP) ................. 2012-289183

(51) Int. Cl.
 *G09G 5/377* (2006.01)
 *G06T 19/00* (2011.01)
 *G06T 7/246* (2017.01)

(52) U.S. Cl.
 CPC ............ *G09G 5/377* (2013.01); *G06T 7/246* (2017.01); *G06T 19/006* (2013.01); *G06T 2207/30204* (2013.01); *G09G 2320/106* (2013.01)

(58) Field of Classification Search
 CPC ....... H04N 13/0468; H04N 2201/0081; H04N 5/145; G06F 3/04815; G06T 11/206; G03B 13/10
 See application file for complete search history.

(56) References Cited

U.S. PATENT DOCUMENTS

| 6,445,409 B1* | 9/2002 | Ito ........................ G01S 3/783 348/155 |
| 7,148,913 B2* | 12/2006 | Keaton .................. G06F 3/011 348/169 |
| 7,301,528 B2* | 11/2007 | Marvit .................. G06F 1/1626 345/156 |
| 2007/0211161 A1* | 9/2007 | Okamoto ............... H04N 5/232 348/333.12 |

(Continued)

FOREIGN PATENT DOCUMENTS

| JP | WO 2010029671 A1 * | 3/2010 | ......... G06F 3/04815 |
| JP | 2011-242816 A | 12/2011 | |
| JP | 2012-058838 A | 3/2012 | |

*Primary Examiner* — Gregory J Tryder
*Assistant Examiner* — Yuehan Wang
(74) *Attorney, Agent, or Firm* — Fitzpatrick, Cella, Harper & Scinto

(57) ABSTRACT

An information display system capable of reducing a trouble about display caused by display of content information corresponding to numerous markers and reducing process loads and a control method of the information display system are provided. In this system, a movement speed and a movement direction of a client apparatus operated by a user are detected, and a size and a position of a marker recognition area for recognizing a marker in an imaged image are determined according to the detected movement speed and the detected movement direction. Then, the content information corresponding to the marker recognized in the marker recognition area is superposed on the imaged image and output to a display screen.

16 Claims, 10 Drawing Sheets

(56) References Cited

U.S. PATENT DOCUMENTS

| | | | |
|---|---|---|---|
| 2010/0238262 A1* | 9/2010 | Kurtz | H04N 7/147 |
| | | | 348/14.01 |
| 2012/0056898 A1 | 3/2012 | Tsurumi et al. | |
| 2013/0127980 A1* | 5/2013 | Haddick | G06F 3/013 |
| | | | 348/14.08 |
| 2014/0168056 A1* | 6/2014 | Swaminathan | G06K 9/00604 |
| | | | 345/156 |

* cited by examiner

401

401

401

401

INFORMATION DISPLAY APPARATUS, INFORMATION DISPLAY SYSTEM, CONTROL METHOD THEREOF, AND PROGRAM

BACKGROUND OF THE INVENTION

Field of the Invention

The present invention relates to an information display apparatus which superposes information on an image which has been captured by imaging (hereinafter, this image will be called an imaged image) and displays the imaged image together with the superposed information, an information display system to which the information display apparatus is applied, a control method for the information display apparatus, and a program which is used to achieve the control method.

Description of the Related Art

Various kinds of techniques and systems which use augmented reality have been published (Japanese Patent Application Laid-Open No. 2011-242816, Japanese Patent Application Laid-Open No. 2012-058838). More specifically, Japanese Patent Application Laid-Open No. 2011-242816 describes that the display contents of augmented reality are changed according to an imaging direction and a user profile, and Japanese Patent Application Laid-Open No. 2012-058838 describes that, when numerous display targets of augmented reality exist in an input image, display priority is determined by performing weighting to the display targets in the imaged image.

However, in the above techniques of the related art, there are following problems. That is, in such a mechanism as disclosed in Japanese Patent Application Laid-Open No. 2011-242816, if a plurality of augmented reality markers exist in a document which is in a certain direction, contents corresponding to all the pertinent markers are displayed, whereby a user is burdened with viewing of these markers.

Moreover, in such a mechanism as disclosed in Japanese Patent Application Laid-Open No. 2012-058838 corresponding to a plurality of markers, since markers are processed in the whole imaged area for the purpose of weight determination, the number of processes inevitably increases in proportion to an increase of the number of the markers. Consequently, for example, there are fears that a load to the mechanism such as an apparatus or a system becomes high, and that it takes a long time for the processes.

The present invention has been completed in order to solve the above problems, and an object thereof is to provide an information display system capable of reducing a trouble about display caused by display of content information corresponding to numerous markers and reducing process loads, and a control method for the information display system.

SUMMARY OF THE INVENTION

As one means for achieving the above object, in the present invention, there is provided an information display apparatus which superposes information on an imaged image and displays them, comprising: a detection unit configured to detect a movement direction of an imaging target; a determination unit configured to determine a target area from the imaged image, based on the movement direction detected by the detection unit; a recognition unit configured to recognize an object in the imaged image; and a display control unit configured to superpose, on the imaged image, the information related to the object of the target area among the objects recognized by the recognition unit.

Moreover, there is provided a control method for an information display apparatus which superposes information on an imaged image of a client apparatus and displays them, the method comprising: detecting a direction in which the in-imaging client apparatus is moved; determining a target area from the imaged image based on the detected direction; recognizing an object in the imaged image; and superposing, on the imaged image, the information related to the object of the target area among the recognized objects.

According to the present invention, it is possible, by displaying content information of an area on which a user keeps close watch through a user's natural operation, to reduce a trouble about display caused by display of much content information. Moreover, it is possible, by limiting the content information to be displayed, to reduce process loads.

Further features of the present invention will become apparent from the following description of exemplary embodiments with reference to the attached drawings.

DESCRIPTION OF THE EMBODIMENTS

Hereinafter, preferred embodiments of the present invention will be described in detail with reference to the attached drawings. Incidentally, it should be noted that constitutions described in the following embodiments are merely examples, and thus the present invention is not limited to the described and illustrated constitutions.

First Embodiment

As the first embodiment of the present invention, an example of an information display system in which an area on which a user keeps close watch is decided based on an operation (i.e., a movement of a client apparatus, a change of an imaging direction, or the like) of the user who is in imaging and an area (i.e., a target area) in which markers (objects) are detected is changed based on the decided result will be described hereinafter.

Figure 1:
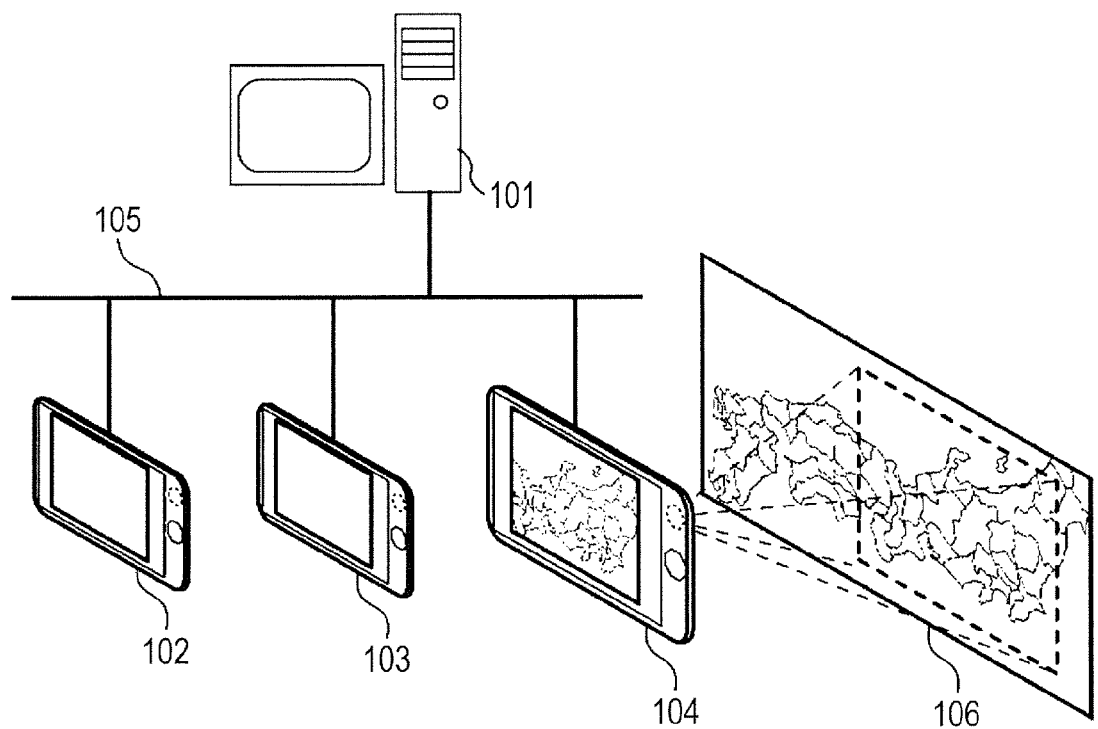
FIG. 1 is a diagram illustrating a network configuration of an information display system according to a first embodiment of the present invention.

FIG. 1 is a diagram illustrating an example of the network configuration of the information display system according to the present invention.

In the drawing, a server apparatus 101 manages and distributes a content corresponding to a marker (i.e., an object) which has been embedded in a document 106 such as a map or the like. Each of client apparatuses 102 to 104 such as a mobile phone terminal, a personal digital assistant and/or the like detects (recognizes) a marker in an image which has been obtained by imaging, obtains the content corresponding to the detected marker from the server apparatus 101, and displays the obtained content. Here, it should be noted that the image which has been obtained by imaging is also called the imaged image, hereinafter. For example, as the marker, it is possible to use a specific image such as a two-dimensional bar code, or to use a specific image or the like which is detected in an infrared area or an ultraviolet area. Each of the client apparatuses has a communication function therein, and is connected to a network 105. Incidentally, it is possible to have a configuration in which the content has been stored in the client apparatus itself, and the stored content is displayed on the side of the client apparatus in accordance with the marker detected in the imaged image. In such a case, since the content is not necessarily transmitted from the server apparatus 101, it is possible to have a configuration in which the server apparatus 101 is not provided.

Figure 2:
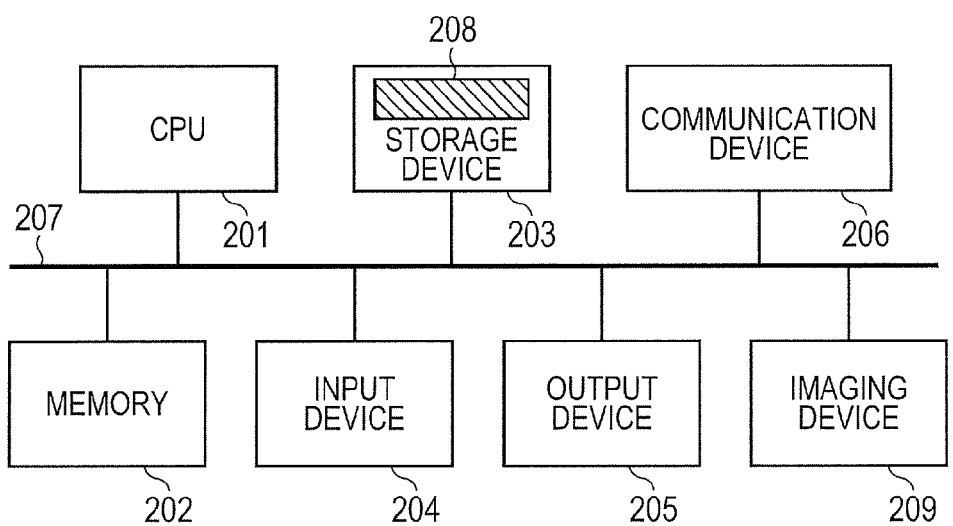
FIG. 2 is a diagram illustrating an internal constitution of a client apparatus according to the first embodiment.

FIG. 2 is a diagram illustrating an internal constitution of the client apparatus 102 according to the first embodiment. More specifically, the client apparatus 102 comprises a CPU (central processing unit) 201, a memory 202, a storage device 203, an input device 204, an output device 205, a communication device 206, and an imaging device 209 for imaging the document 106 and the like. Here, it should be noted that these units and devices are mutually connected to others through a bus 207.

The CPU 201 achieves later-described various functions by executing a program 208 and the like stored in the storage device 203. The memory 202 temporarily stores therein the programs and the data read from the storage device 203 by the CPU 201. Moreover, the memory 202 is used as an area to be used for the CPU 201 to execute various programs. The storage device 203 stores therein an OS (operating system), various programs, control programs, various data and the like. Here, the programs to be stored by the storage device 203 include a program for detecting the markers in the imaged image, a program for displaying the content after detecting the marker, a program for detecting acceleration, a movement direction and the like by a sensor, a program for processing detected data by an image processor, and the like. Incidentally, the storage device 203 is constituted by a mass-storage device such as an SSD (solid state device), an HDD (hard disk drive) or the like.

The input device 204 is a function unit which receives and accepts an input sent mainly from the user. For example, instructions for starting/stopping the imaging by the imaging device 209, the information of the acceleration, the movement direction and the like detected by moving the client apparatus, and the like are input through the input device 204.

The output device 205 displays the information input by the input device 204, a result obtained by executing the program with the CPU 201, and the like.

The communication device 206 is the device which is used to connect the client apparatus to the network. In case of detecting the marker and displaying the content corresponding to the marker, if the content exists in the server apparatus 101, the communication device transmits the marker information and receives the content information. In case of displaying the content information without communicating with an external device, the communication device 206 is not necessarily provided.

The bus 207 is used to connect these devices to others for the purpose of data transfer.

The control programs 208 have been stored as partial data in the storage device 203.

The imaging device 209 images the document 106 and the like. Here, if the marker is the image which is detected (recognized) in the infrared area or the ultraviolet area as described above, the imaging device is constituted by a device which has sensitivity for such wavelength areas.

Figure 3:
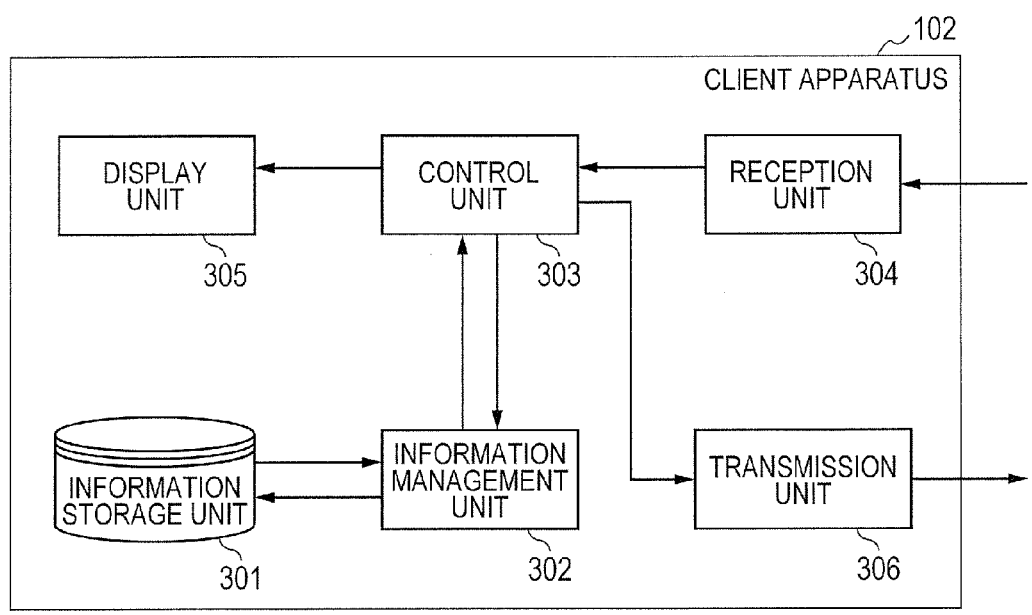
FIG. 3 is a function block diagram illustrating the client apparatus according to the first embodiment.

FIG. 3 is a function block diagram illustrating the client apparatus 102 according to the first embodiment. More specifically, the client apparatus 102 is constituted by function units including an information storage unit 301, an information management unit 302, a control unit (a recognition unit, a measurement unit, a change unit, a display processing unit) 303, a reception unit 304, a display unit 305 and a transmission unit 306.

The information storage unit 301 is the function unit which stores therein the content information to be displayed, the information obtained by the user's operation to the client apparatus 102, and the like, in response to instructions from the later-described information management unit 302. More specifically, on the premise that the CPU 201 executes the program 208, the information is stored and secured in the memory 202 and the storage device 203.

The information management unit 302 is the function unit which operates and manages the information to be stored in the information storage unit 301. In other words, the information management unit operates and manages the information storage unit 301, in response to requests sent from the later-described control unit 303. More specifically, the operation and the management by the information management unit are achieved on the premise that the CPU 201 executes the program 208.

The control unit 303 is the function unit which controls to perform the respective functions of the program 208 in response to the information received by the later-described reception unit 304. Incidentally, since the control unit 303 comprises an internal timer, it is possible for the control unit to obtain various times. Moreover, the control unit 303 detects whether or not the marker exists in the image obtained by the imaging of the imaging device 209, and stores the information related to the detected marker in the information storage unit 301.

The reception unit 304 is the function unit which receives the information directly input by the user or transmitted from the server apparatus 101, and notifies the received information to the control unit 303.

The display unit 305 is the function unit which displays the results obtained by performing the various functions with the control unit 303 based on the information input by the reception unit 304. More specifically, this unit is constituted by the output device 205.

The transmission unit 306 is the function unit which transmits the information of the information storage unit 301 and the like outwardly, in response to an instruction or the like from the control unit 303.

Figure 4:
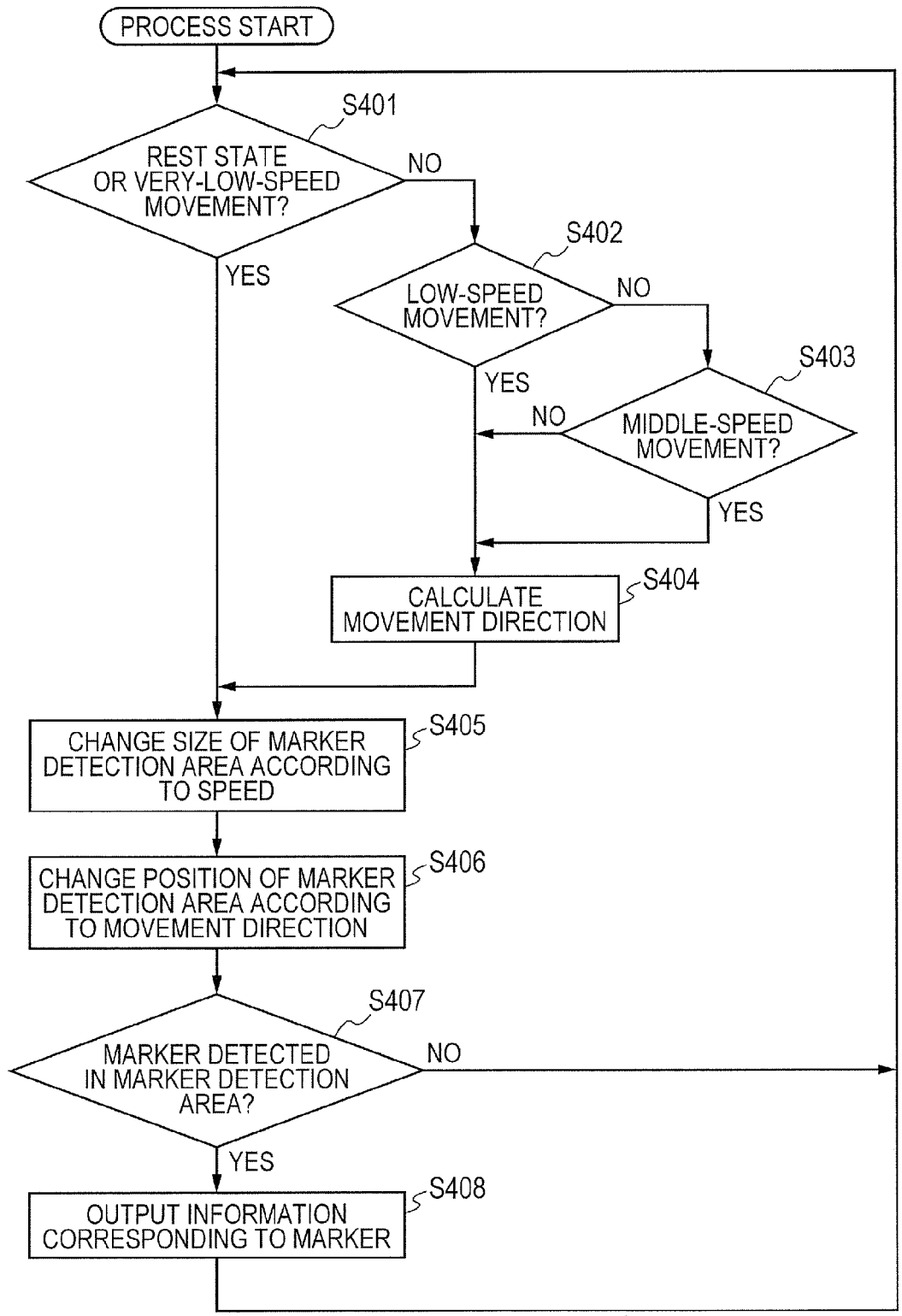
FIG. 4 is a flow chart for describing an operation of the client apparatus according to the first embodiment.

FIG. 4 is a flow chart for describing an operation of the client apparatus 102 in the electronic information display system according to the first embodiment. Here, the CPU of the client apparatus 102 performs the process in the flow chart by executing the above program 208.

In a step S401, the control unit 303 measures the movement speed of the client apparatus, and decides based on the measured speed whether or not the client apparatus is in a rest state or very-low-speed movement. More specifically, when the measured speed is equal to or lower than a set threshold value (i.e., equal to or lower than a first threshold value), it is decided by the control unit 303 that the client apparatus is in the rest state or the very-low-speed movement, and the process goes to a step S405. On the other hand, when the measured speed exceeds the first threshold value, the control unit 303 further measures the movement speed in steps S402 and S403. More specifically, in the step S402, the control unit 303 decides whether or not the measured and detected speed exceeds a second threshold value. When the measured and detected speed is equal to or lower than the second threshold value, it is decided that the client apparatus is in a "low-speed movement". On the other hand, when the measured and detected speed exceeds the second threshold value, then the control unit further decides in the step S403 whether or not the measured and detected speed exceeds a third threshold value. When the measured and detected speed is equal to or lower than the third threshold value, it is detected that the client apparatus is in a "middle-speed movement". On the other hand, when the measured and detected speed exceeds the third threshold value, it is detected that the client apparatus is in a "high-speed movement". After then, the control unit 303 calculates the movement direction in a step S404.

Incidentally, in a case where a sensor such as a triaxial acceleration sensor, a gyro sensor or the like has been installed the client apparatus 102, it is possible in the step S401 to decide the movement speed and the movement direction on the basis of a detected output of the sensor. Alternatively, it is possible to calculate the movement speed and the movement direction through an image process to be performed to the image imaged by the imaging device 209. In any case, if it is constituted to decide the movement speed and the movement direction through the sensor, it is possible to increase the decision speed as compared with the case where the decision is performed through the normal CPU process, and thus achieve a smart operation. On the other hand, if it is constituted to decide the movement speed and the movement direction through the image process, it is possible to omit the sensor from the products. Besides, since it is possible to apply the above decision process even to the product to which any sensor cannot be installed additionally, it is possible to reduce costs.

In the steps S405 and S406, the size, the position and the shape of a marker detection area (i.e., a target area) in which the marker is detected are changed in accordance with the results detected in the steps S401 to S404.

Figure 5:
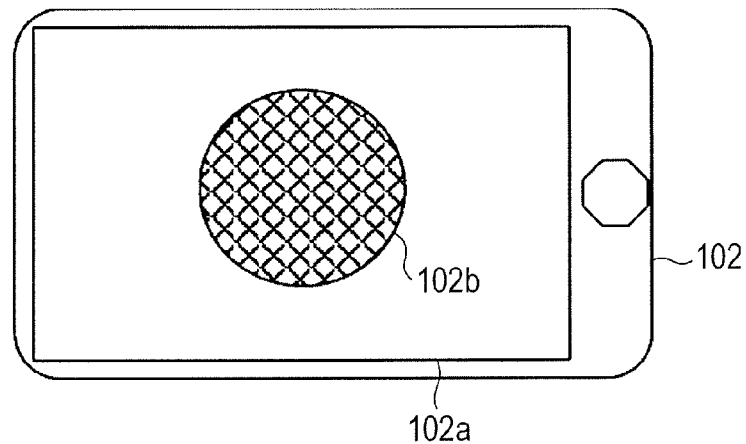
FIG. 5 is a diagram exemplarily illustrating a display section and a marker detection area of the client apparatus according to the first embodiment.

FIG. 5 is a diagram illustrating an example of the state which has been decided in the step S401 as the rest state or the very-low-speed movement. In the state like this, it is conceivable that the user keeps close watch on the center of a screen 102*a* of the client apparatus 102. Consequently, the control unit 303 considers a marker detection area (target area) 102*b* as a first area which is located near the center of the screen 102*a* of the client apparatus 102.

Incidentally, although the marker detection area (target area) 102*b* is circular in FIG. 5 for convenience of the description, this is merely an example. It should be noted that the marker detection area (target area) 102*b* is not necessarily circular. Namely, the marker detection area may be, e.g., rectangular.

Figure 6:
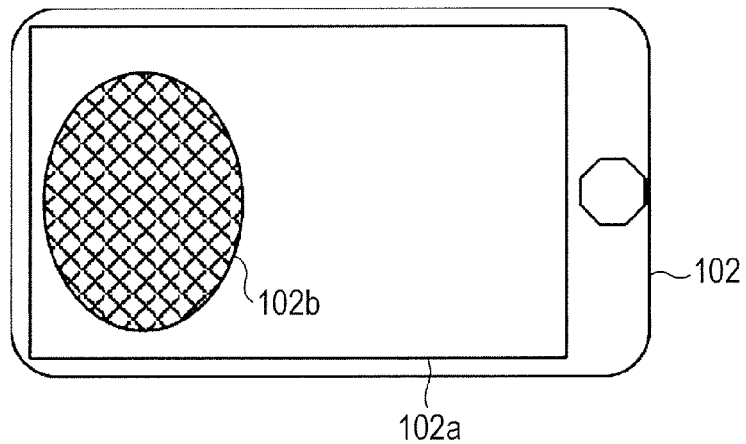
FIG. 6 is a diagram exemplarily illustrating the display section and the marker detection area of the client apparatus according to the first embodiment.

FIG. 6 is a diagram illustrating an example of the state that it has been decided in the step S402 that the client apparatus 102 is in the leftward low-speed movement (e.g., lower than 3 cm per second). In the state like this, it is conceivable that the user keeps close watch on the information displayed on the left of the screen 102*a*. Consequently, the control unit 303 considers the marker detection area (target area) 102*b* as an area (i.e., a second area) which is shifted to the left from the center of the screen 102*a*.

Here, it should be noted that the area which is shifted to the left indicates an area which includes information to be displayed left and information to be displayed right and the amount of information to be displayed left is larger than the amount of information to be displayed right.

In each of FIG. 6 and later-described FIG. 7, although the shifted marker detection area (target area) 102*b* is elliptical for convenience of the description, this is merely an example. Namely, it should be noted that the shifted marker detection area (target area) 102*b* is not necessarily elliptical.

Figure 7:
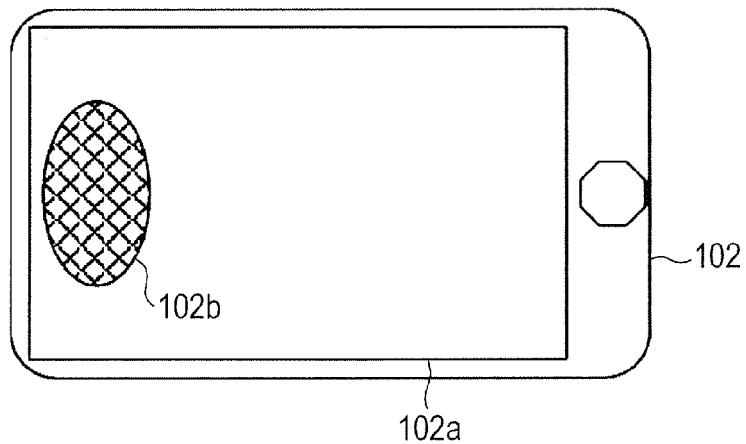
FIG. 7 is a diagram exemplarily illustrating the display section and the marker detection area of the client apparatus according to the first embodiment.

Moreover, FIG. 7 is the diagram illustrating an example of the state that it has been decided in the step S403 that the client apparatus 102 is in the leftward middle-speed movement (e.g., lower than 6 cm per second). In the state like this, it is conceivable that the area on the screen 102a on which the user keeps close watch is narrow. Consequently, the control unit 303 considers the marker detection area (target area) 102b as an area (i.e., a third area) which is narrower than that illustrated in FIG. 6. Here, it should be noted that the narrow area indicates an area in which any one or both of the vertical and horizontal areas are narrow.

Further, in the state that it has been decided in the step S403 that the client apparatus is in the high-speed movement (e.g., equal to or higher than 6 cm per second), the control unit 303 considers the marker detection area 102b as an area which is further narrower than that illustrated in FIG. 7. Besides, in the case of the high-speed movement, it is also possible to consider that the user does not keep close watch on the screen 102a and thus not to display any content information.

In a step S407, it is detected whether or not the marker exists in the marker detection area (target area) 102b in the image which has been imaged by the imaging device 209. When it is detected that the marker exists in the marker detection area, then, in a step S408, the content information corresponding or related to the detected marker is superposed on the imaged image, and the obtained image information is output and displayed on the screen 102a. After the output of the content information like this was completed, the control unit 303 returns the process to the initial step (S401), and the above processes are repeated.

Thus, the size, the position and the shape of the marker detection area in the imaged image are changed according to the movement speed and the movement direction of the client apparatus 102, the content information corresponding to the marker in the marker detection area is superposed on the imaged image, and the imaged image is displayed together with the superposed content information.

Figure 8:
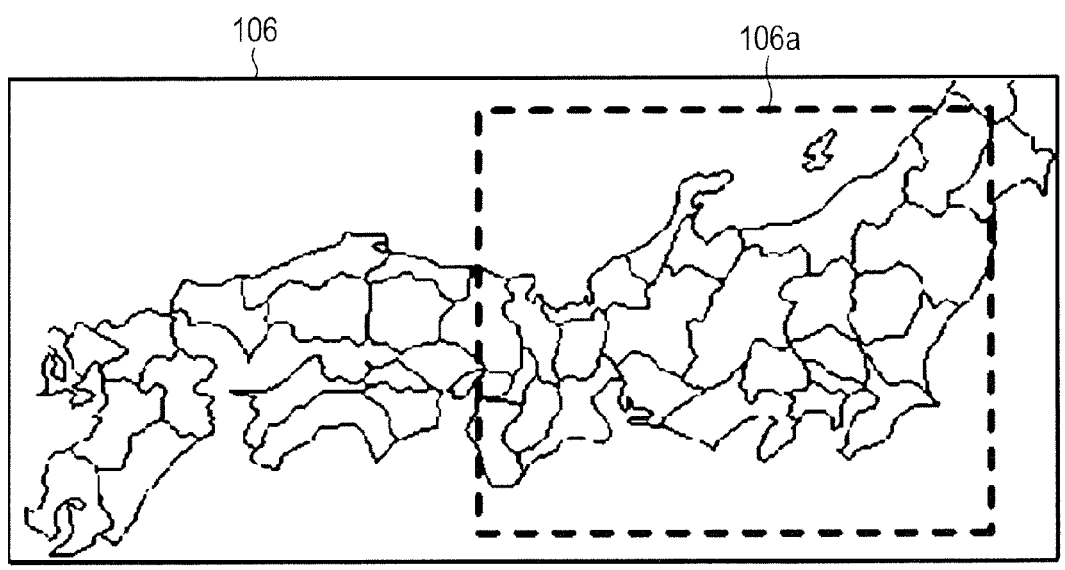
FIG. 8 is a diagram exemplarily illustrating a document (i.e., an example of a map) in which a marker has been embedded.

FIG. 8 is a diagram illustrating an example of a document in which a marker (object) has been embedded.

Figure 9:
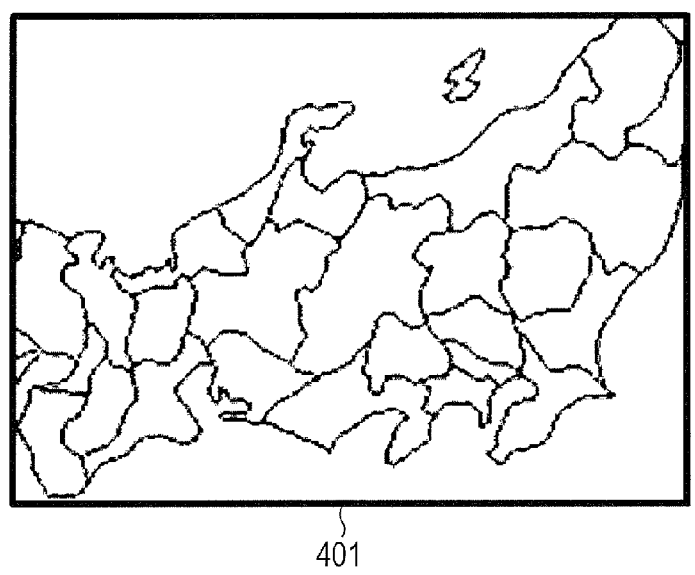
FIG. 9 is a diagram exemplarily illustrating an image which is obtained by imaging with the client apparatus the document in which the marker has been embedded.

FIG. 9 is a diagram illustrating an example of a document 401 which is displayed on the screen 102a when a part 106a of the document 106 is imaged by the client apparatus 102.

Figure 10:
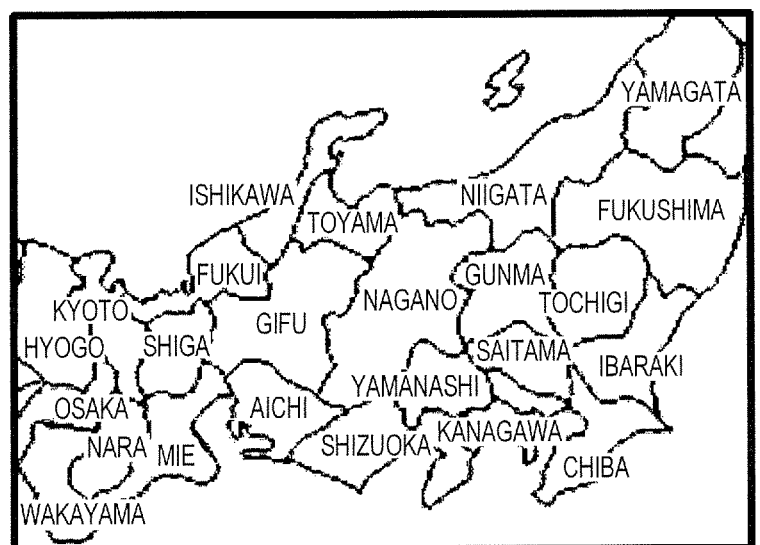
FIG. 10 is a diagram exemplarily illustrating a state that whole content information corresponding to the markers is superposed on the image which is obtained by imaging with the client apparatus the document in which the markers have been embedded, and the image on which the content information has been superposed is displayed.

In a case where the content information corresponding to all the markers in the imaged image is superposed and displayed, for example, as illustrated in FIG. 10, if numerous markers exist in an image, numerous content information (data) are superposed on the imaged image and displayed. Incidentally, FIG. 10 shows the case where the contents corresponding to the markers are only the names of prefectures. Here, if the information related to the prefectures is included as the content information, since further numerous content information data are displayed, there is fear that the screen of the client apparatus is covered with the information.

Figure 11:
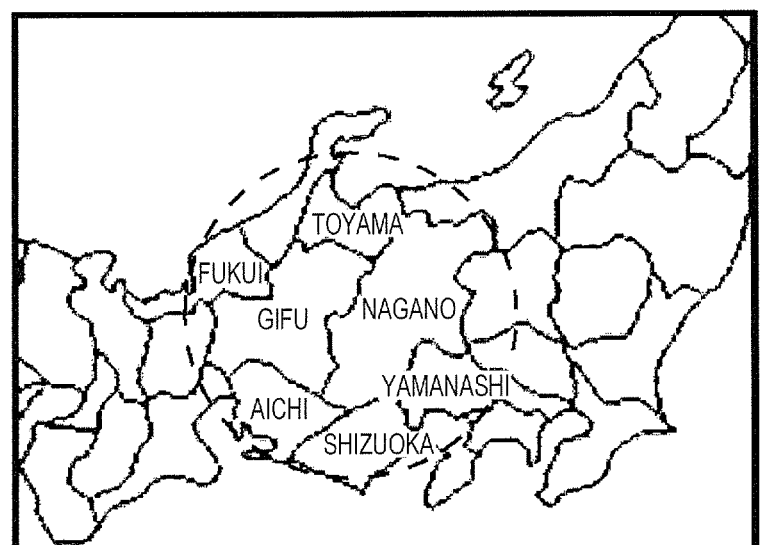
FIG. 11 is a diagram exemplarily illustrating a state that the content information corresponding to the markers is superposed on the image which is obtained by imaging with the client apparatus of the first embodiment the document in which the markers have been embedded, and the image on which the content information has been superposed is displayed.
Figure 12:
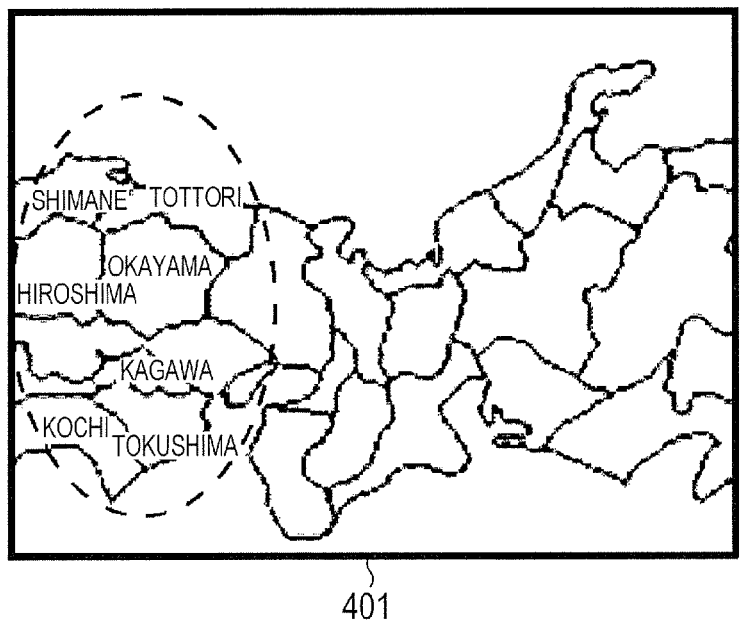
FIG. 12 is a diagram exemplarily illustrating a state that the content information corresponding to the markers is superposed on the image which is obtained by imaging with the client apparatus of the first embodiment the document in which the markers have been embedded, and the image on which the content information has been superposed is displayed.
Figure 13:
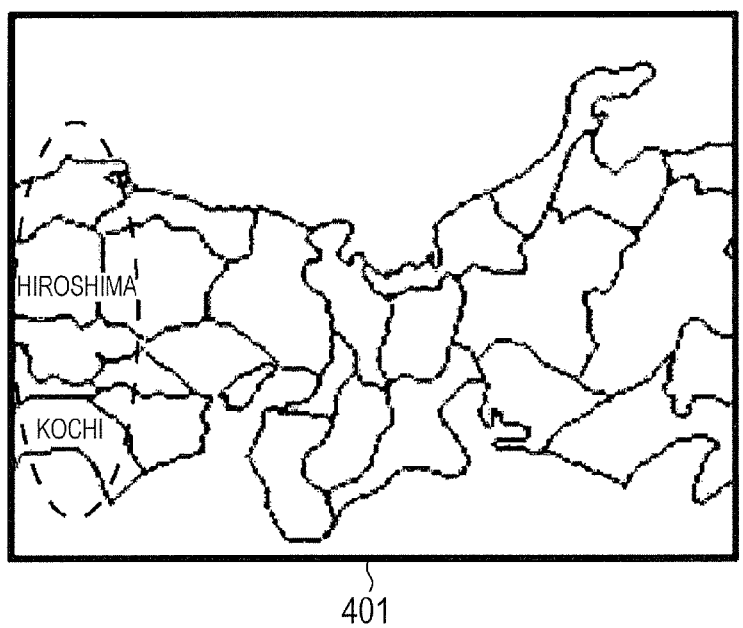
FIG. 13 is a diagram exemplarily illustrating a state that the content information corresponding to the markers is superposed on the image which is obtained by imaging with the client apparatus of the first embodiment the document in which the markers have been embedded, and the image on which the content information has been superposed is displayed.

On the other hand, each of FIGS. 11, 12 and 13 is a diagram illustrating an example of the document 401 which is displayed on the screen 102a when the process illustrated in the flow chart of FIG. 4 is performed.

More specifically, FIG. 11 illustrates the display example of the content information in the state that the client apparatus 102 does not detect any movement.

FIG. 12 illustrates the display example of the content information in the state that the client apparatus 102 is in the leftward "low-speed movement".

FIG. 13 illustrates the display example of the content information in the state that the client apparatus 102 is in the leftward "middle-speed movement".

As illustrated in these drawings, in the information display system, the size, the position and the shape of the marker detection area are changed according to the movement speed and the movement direction of the client apparatus 102, and the content information corresponding to the marker in the marker detection area is displayed. By the operation like this, it is possible to display the information which is appropriate for the user. For example, if the user moves the client apparatus 102 so that the desired position in the document is appropriately displayed on the screen, the size, the position and the shape of the marker detection area are changed according to such movement. When the user moves the client apparatus 102, he/she first moves the client apparatus swiftly (e.g., by the "middle-speed movement") toward the target location in the document. Then, it is conceivable that the user reduces the movement speed (e.g., from the "low-speed movement" to "stop") as the client apparatus approaches the target location. Consequently, when the client apparatus is moved like this, the narrow marker detection area is first set at the position toward the movement direction. However, the larger marker detection area near the center of the image is set as the user reduces the movement speed.

As just described, in the client apparatus 102 according to the first embodiment, the area of the screen on which the user presumably keeps close watch is set as the marker detection area in accordance with the movement state of the client apparatus 102. Thus, since the content information corresponding to the marker in the marker detection area of which the size, the position and the shape are changed is superposed on the imaged image and the imaged image is displayed together with the superposed content information, it is possible to properly control or suppress the content information to be displayed. Consequently, it is possible to reduce a trouble about display caused by display of numerous content information. Moreover, since the content information to be displayed is limited, it is possible to reduce the process loads of display.

Second Embodiment

In the first embodiment, the example that the content information to be displayed is limited by changing the size, the position and the shape of the marker detection area through the operation to be performed in the imaging has been described. On another front, in the second embodiment, an example that display of the content information is changed by changing priority or importance of marker detection through an operation in an imaging action will be described. Incidentally, since the network configuration, the internal structure and the function block diagrams for an information display system in the second embodiment are the same as those in the first embodiment, descriptions of these matters will be omitted.

Figure 14:
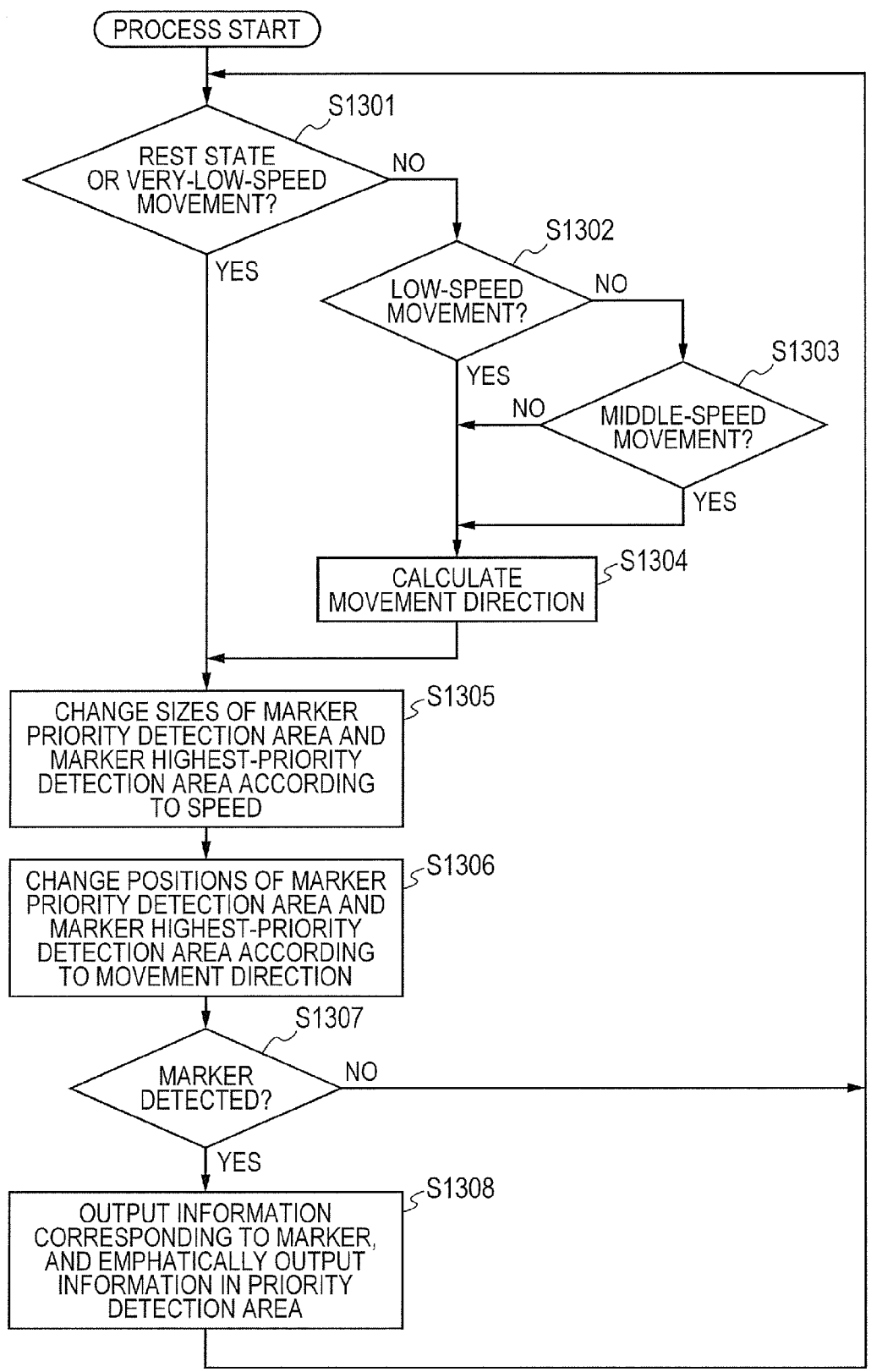
FIG. 14 is a flow chart for describing an operation of a client apparatus according to the second embodiment.

FIG. 14 is a flow chart for describing the operation of the client apparatus 102 in the information display system according to the second embodiment. Here, the process in the flow chart is achieved on the premise that the CPU executes the control program. Incidentally, since the processes in steps S1301 to S1304 are the same as those in the steps S401 to S404 in FIG. 4 for deciding the movement state of the client apparatus, description of these processes will be omitted.

In steps S1305 and S1306, the marker detection area (i.e., the whole of the imaged image in the present embodiment) in which the marker is detected according to the movement state of the client apparatus detected in the steps S1301 to S1304 is sectioned on based on the importance, and a process of changing the size, the position and the shape of the area (i.e., a marker priority detection area (a change area)) of which the importance is high is performed.

Figure 15:
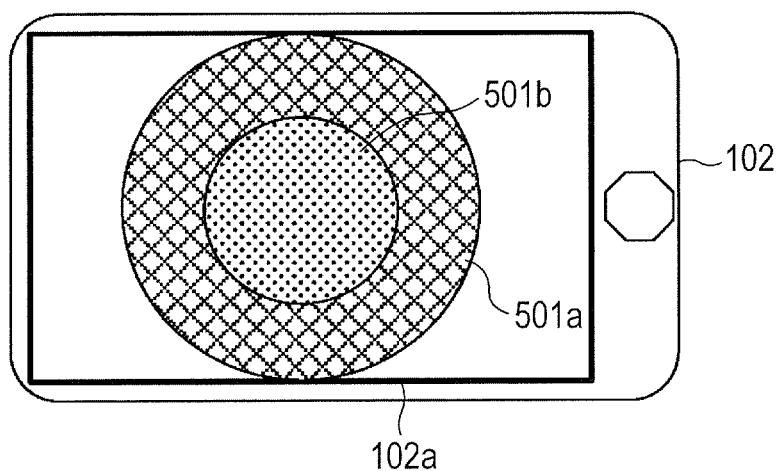
FIG. 15 is a diagram exemplarily illustrating a display section of the client apparatus according to the second embodiment and importance of a marker detection area.

FIG. 15 is a diagram illustrating an example of the state which has been decided in the step S1301 as the rest state or the very-low-speed movement. In the state like this, although the marker detection area in which the marker is detected is set as the whole of the imaged image, it is conceivable that a user mainly keeps close watch on the center of the imaged image area. Consequently, the control unit 303 (i.e., a display processing unit, a display changing unit) handles the central portion of the image as a marker priority detection area 501a of which the importance is high, and further handles the center side (or the inner side) of the central portion of the image as a marker highest-priority detection area 501b of which the importance is more higher.

Figure 16:
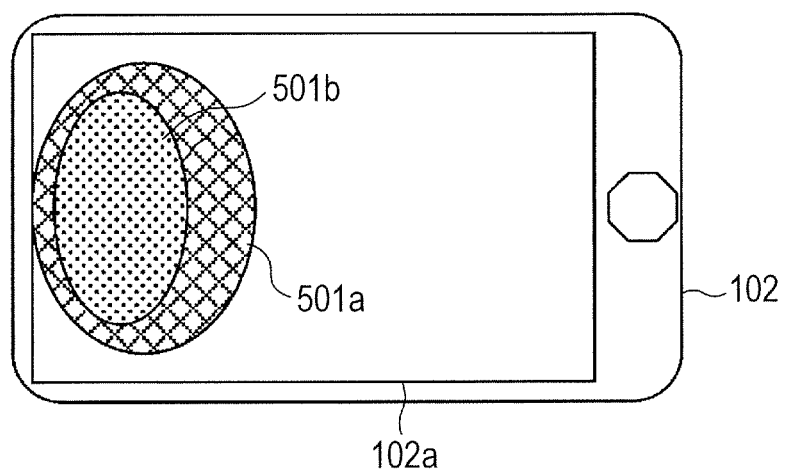
FIG. 16 is a diagram exemplarily illustrating the display section of the client apparatus according to the second embodiment and importance of the marker detection area.

FIG. 16 is a diagram illustrating an example of the state that the movement speed has been decided in the step S1302 as the low speed and the movement direction has been decided in the step S1304 as the left. In this case, it is conceivable that the user keeps close watch on the information displayed on the left of the screen 102a of the client apparatus 102. Consequently, the control unit 303 handles the marker priority detection area 501a and the marker highest-priority detection area 501b as the areas which have been shifted to the left of the center of the screen 102a and also handles these areas as the high-priority areas.

In a step S1307, it is decided whether or not the marker exists in the marker detection area (i.e., anywhere in the whole image displayed on the screen 102a).

In a step S1308, the content information corresponding to the detected marker is emphasized according to the priority or the importance, the emphasized content information is superposed on the imaged image, and they are output to the screen 102a. Incidentally, the priority or the importance is decided based on whether or not the detected marker exists in the marker priority detection area 501a or the marker highest-priority detection area 501b.

For example, the content information corresponding to the marker existing in the marker priority detection area 501a is output to the screen 102a in the size one point larger than the character size of the content information corresponding to the marker existing outside the marker priority detection area 501a. Moreover, the content information corresponding to the marker existing in the marker highest-priority detection area 501b is output to the screen 102a in the size two points larger than the character size of the content information corresponding to the marker existing outside the marker highest-priority detection area 501b.

After the output of the content information was completed as described above, the control unit 303 returns the process to the initial step (S1301), and the above processes are repeated.

As just described, in accordance with the movement of the client apparatus 102, the content information corresponding to the markers existing in the marker priority detection area 501a and the marker highest-priority detection area 501b in the imaged image are emphasized and superposed on the imaged image, and the imaged image on which the emphasized content information has been superposed is displayed.

Figure 17:
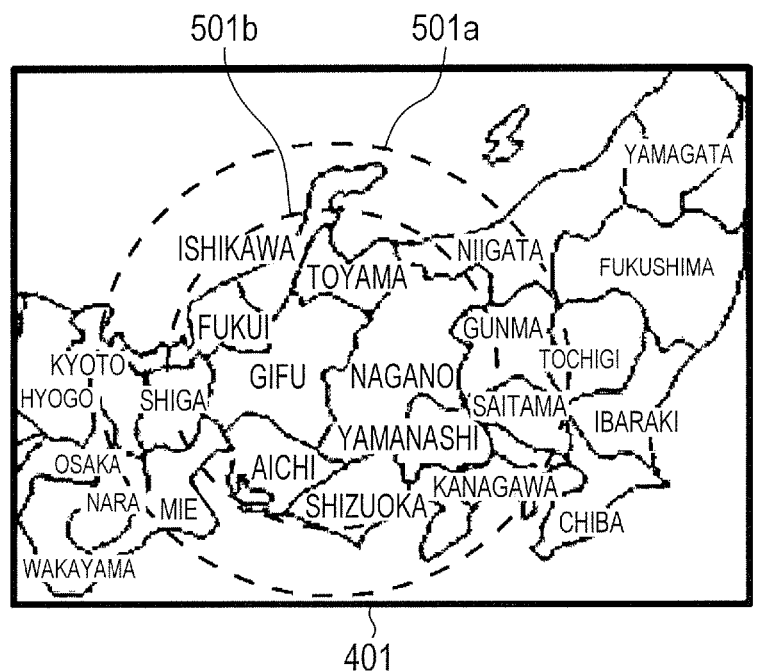
FIG. 17 is a diagram exemplarily illustrating a state that the content information corresponding to the markers is superposed on the image which is obtained by imaging with the client apparatus of the second embodiment the document in which the markers have been embedded, and the image on which the content information has been superposed is displayed.

FIG. 17 is a diagram illustrating an example of the document 401 to be displayed on the screen 102a at the time when the operation process indicated by the flow chart in FIG. 14 is performed. More specifically, FIG. 17 shows a display example of the content information in the state that the client apparatus 102 does not detect any movement yet.

As illustrated in the drawing, the control unit 303 changes the display form of the content information such that the content information of the higher-importance area is displayed in larger size, whereas the content information of the lower-importance area is displayed in smaller size.

In this example, it is assumed that characters are displayed respectively in three different sizes of large, medium and small sizes.

More specifically, the size of the character (e.g., "YAMAGATA") of the content information corresponding to the marker existing outside the marker priority detection area 501a is the small size.

Further, the size of the character (e.g., "SAITAMA") of the content information corresponding to the marker existing in the marker priority detection area 501a and outside the marker highest-priority detection area 501b is the medium size.

Furthermore, the size of the character (e.g., "NAGANO") of the content information corresponding to the marker existing in the marker highest-priority detection area 501b is the large size.

Incidentally, it should be noted that, as well as the change of the marker detection area in the first embodiment, the positions, the sizes and the shapes of the marker priority detection area and the marker highest-priority detection area are changed according to the movement of the client apparatus 102.

In the case where the user moves the client apparatus 102 such that the desired position in the document is displayed on the screen, it is conceivable that he/she first moves the client apparatus swiftly toward a target location in the document, and then reduces the movement speed of the client apparatus as the client apparatus approaches the target location. In this case, the narrow areas on the side from which the movement direction extends are first set as the high-importance marker priority detection area 501a and the high-importance marker highest-priority detection area 501b. Then, according as the movement speed is reduced, the areas closer to the center of the screen are set as the high-importance marker priority detection area 501a and the high-importance marker highest-priority detection area 501b. By doing so, it is possible to clearly display the portion on which the user keeps close watch, and it is also possible to make portions other than the portion on which the user keeps close watch less noticeable although the relevant portions are being displayed. Consequently, it is possible to have an effect of not imposing a strain on the user.

Incidentally, although the marker detection area is sectioned based on the three kinds of priorities (i.e., the marker priority detection area 501a, the marker highest-priority detection area 501b, and other area) in the second embodiment, the number of priorities is not limited to this. Namely, it is possible to set any number of priorities if it is two or more. Moreover, it is possible to control or suppress the information at the portion on which the user does not keep close watch, by changing the number of priorities according to a condition such as the total number of markers existing in the imaged image or the like.

Besides, although the display size of the content information is changed according to the priority in the second embodiment, it is possible to change, instead of the display size, the display percentages of the content information according to the priority. For example, in the document illustrated in FIG. 17, the names of the prefectures and the information related to these prefectures which have been given as the content information are all displayed in the high-priority area, whereas, although the names of the prefectures and the information related to these prefectures have been given as the content information, only the names of the prefectures are displayed in the low-priority area. As just described, there is no problem if the method of displaying the whole or the part of the inherently given information according to the priority is adopted. Thus, since the area in which only the part of the display contents is handled exists, it is possible to reduce loads on the processing side in the system.

As described above, it is possible by the client apparatus 102 according to the second embodiment to identify the location on which the user keeps close watch by the imaging and browsing operations using the client apparatus 102. For this reason, it is possible to make the user to easily watch the displayed contents by properly changing the display form of the size of the content information, the details of the information, the amount of information and the like according to the location on which the user keeps close watch. Moreover, it is possible to reduce the process loads by properly changing the display form so as to reduce the details of the information or the amount of information.

Other Embodiments

It is possible to decide whether or not to perform the processes of the first and second embodiments in accordance with a density or a percentage of the markers and the content information included in the imaged area by the client apparatus 102. More specifically, in a case where the percentage of the markers (i.e., the percentage of the objects) does not exceed a threshold value, there is no need to perform the processes of the first and second embodiments. Here, it should be noted that the percentage of the objects is calculated by, e.g., the following equation.

The percentage of the objects=(the number of the objects included in the imaged area)/(the number of the objects predetermined based on the size of the screen 102a)

Figure 18:
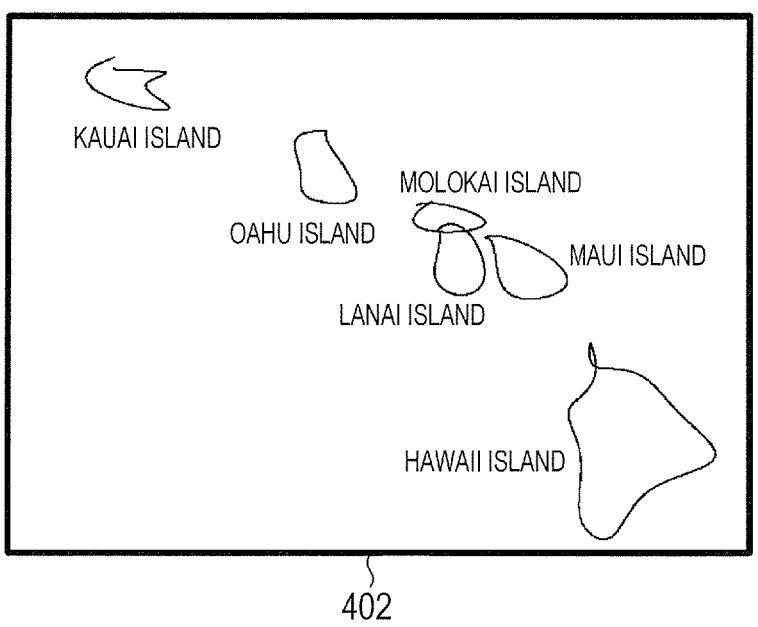
FIG. 18 is a diagram exemplarily illustrating a state that a document in which markers have been embedded is imaged by a client apparatus according to another embodiment.

For example, FIG. 18 is a diagram illustrating a state that a document 402 in which the density of markers is low has been imaged.

Like this, in the case where the density of the markers is low, it is conceivable that the display of the whole content information is not cumbersome. Consequently, in this case, the number of the markers existing in the imaged image is detected and the marker detection area is set according to the detected number of the markers, before the process of the flow chart illustrated in FIG. 4 or FIG. 14 is performed. More specifically, the client apparatus first detects the number of all the markers in the imaged image obtained by the imaging device 209. Then, if the detected number of the markers is smaller than a predetermined threshold value (e.g., about 5 to 20), a process of superposing the content information corresponding to all the markers existing in the imaged image on the imaged image and displaying the imaged image together with the superposed content information is performed instead of the process of the flow chart illustrated in FIG. 4 or FIG. 14.

In a case where the process same as that to be performed when the number of the markers is large is performed when the density of the markers is low, there is a possibility that the process load is increased as compared with the normal display process. However, it is possible by performing such an operation as described above to suppress or control an increase of the load. Also, from the viewpoint of the user, the display of the whole content information is not cumbersome because the density of the markers is low. Therefore, it is possible for the user to glance over the content information with less load.

As above, the embodiments of the present invention have been described in detail. Moreover, the present invention can be carried out as, e.g., a system, an apparatus, a method, a program, a recording medium (a storage medium) or the like. More specifically, the present invention can be applied to a system which consists of a plurality of devices (e.g., a host computer, an interface device, an imaging device, a Web application, and the like), or to an apparatus which comprises a single device.

The embodiments of the present invention can also be realized by a computer of a system or an apparatus that reads out and executes computer executable instructions recorded on a storage medium (e.g., a non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), a micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-289183, filed Dec. 29, 2012, which is hereby incorporated by reference herein in its entirety.

What is claimed is:

1. An information display apparatus which superposes information on an imaged image and displays them, comprising:
 a detection unit configured to detect, with a sensor, a movement direction of the imaged image relative to an imaging target;
 a determination unit configured to determine a location of a target area within the imaged image, based on the movement direction detected by the detection unit, wherein the location of the target area is shifted within the imaged image in the movement direction detected by the detection unit;
 a recognition unit configured to recognize an object in the imaged image; and
 a display control unit configured to superpose, on the imaged image, information related to the object when the object is in the target area, and not superpose, on the imaged image, the information related to the object when the object is outside the target area,
 wherein, in a case where a ratio of the objects existing in the imaged image does not exceed a threshold value, the detection unit does not measure the movement direction, the determination unit determines the whole imaged image as the target area, the recognition unit recognizes the objects recognizable in the imaged image, and the display control unit superposes, on the imaged image, the information related to the recognized objects in the imaged image.

2. The information display apparatus according to claim 1, wherein the detection unit further detects a speed of movement of the imaged image, and in a case where the speed detected by the detection unit is equal to or lower than a first threshold value, the determination unit determines the location of the target area as a first area which is located near the center, and, in a case where the speed detected by the detection unit exceeds the first threshold value, the determination unit determines the location of the target area as a second area which is shifted within the imaging target in the movement direction detected by the detection unit.

3. The information display apparatus according to claim 2, wherein, in a case where the speed detected by the detection unit exceeds a second threshold value larger than the first threshold value, the determination unit determines the target area as a third area which is narrower than the second area.

4. The information display apparatus according to claim 1, wherein the recognition unit recognizes the object in the imaged image existing in the target area at a changed position within the imaged image.

5. An information display apparatus which superposes information on an imaged image and displays them, comprising:

a detection unit configured to detect a movement direction of the imaged image relative to an imaging target;

a determination unit configured to determine a location of a target area within the imaged image, based on the movement direction detected by the detection unit, wherein the location of the target area is shifted within the imaged image in the movement direction detected by the detection unit;

a recognition unit configured to recognize an object in the imaged image; and a display control unit configured to superpose, on the imaged image, a display form of the information related to the object existing in the target area and a display form of the information related to the object existing outside the target area as respectively different display forms, wherein the detection unit further detects a speed of movement of the imaged image, and wherein, in a case where the speed detected by the detection unit is equal to or lower than a first threshold value, the determination unit determines the target area as a first area which is near the center, and, in a case where the speed detected by the detection unit exceeds the first threshold value, the determination unit determines the target area as a second area which is shifted within the imaging target in the movement direction detected by the detection unit, and wherein, in a case where a ratio of the objects existing in the imaged image does not exceed a threshold value, the detection unit does not measure the movement direction and the speed, the determination unit determines the whole imaged image as the target area, the recognition unit recognizes the objects being recognizable in the imaged image, and the display control unit superposes, on the imaged image, the information related to the recognized objects in the imaged image.

6. The information display apparatus according to claim 5, wherein the recognition unit recognizes the object in the imaged image existing in the target area at a changed position within the imaged image.

7. The information display apparatus according to claim 5, wherein the display control unit displays the information related to the object existing in the target area in more detail as compared with the information related to the object existing outside the target area.

8. The information display apparatus according to claim 5, wherein the display control unit displays the information related to the object existing in the target area with more emphasis as compared with the information related to the object existing outside the target area.

9. The information display apparatus according to claim 5, wherein the display control unit displays the information related to the object when the object is in the target area with characters larger than those for displaying the information related to the object when the object is outside the target area.

10. The information display apparatus according to claim 5, wherein the display control unit displays the information related to the object when the object is in the target area and the information related to the object when the object is outside the target area respectively with different fonts.

11. The information display apparatus according to claim 5, wherein the display control unit displays the information related to the object when the object is in the target area and the information related to the object when the object is outside the target area respectively with different colors.

12. An information display system which includes an information display apparatus configured to superpose information on an imaged image and display them, and an information processing apparatus connected to the information display apparatus through a network, wherein:

the information display apparatus comprises a measurement unit configured to measure a movement direction of an imaging direction relative to an imaging target, a change unit configured to change a position of a target area identified from the imaged image based on the movement direction measured by the measurement unit, wherein the position of the target area is shifted within the imaged image in the movement direction measured by the measurement unit, a recognition unit configured to recognize an object in the imaged image, a transmission unit configured to transmit recognition information of the object recognized by the recognition unit, to the information processing apparatus, a reception unit configured to receive information related to the object, from the information processing apparatus, and a display control unit configured to superpose the received information related to the object on the target area in the imaged image, wherein, in a case where a ratio of the objects existing in the imaged image does not exceed a threshold value, the detection unit does not measure the movement direction, the determination unit determines the whole imaged image as the target area, the recognition unit recognizes the objects recognizable in the imaged image, and the display control unit superposes, on the imaged image, the information related to the recognized objects in the imaged image; and the information processing apparatus comprises
a reception unit configured to receive the recognition information of the object from the information display apparatus, and
a transmission unit configured to transmit the information related to the object to the information display apparatus.

13. A control method for an information display apparatus which superposes information on an imaged image of a client apparatus and displays them, the method comprising:
detecting, by a sensor, a direction in which the in-imaging client apparatus is moved relative to an imaging target;
determining a location of a target area within the imaged image based on the detected direction, wherein the location of the target area is shifted within the imaged image in the direction detected by the sensor;
recognizing an object in the imaged image; and
superposing, on the imaged image, the information related to the object existing in the target area, and not superposing, on the imaged image, the information related to the object existing outside the target area,
wherein, in a case where a ratio of the objects existing in the imaged image does not exceed a threshold value,
the detecting does not measure the movement direction,
the determining determines the whole imaged image as the target area,
the recognizing recognizes the objects recognizable in the imaged image, and
the superposing superposes, on the imaged image, the information related to the recognized objects in the imaged image.

14. A control method for an information display apparatus which superposes information on an imaged image of a client apparatus and displays them, the method comprising:
detecting a direction in which the in-imaging client apparatus is moved relative to an imaging target and a speed of movement of the imaged image;
determining a location of a target area within the imaged image based on the detected direction, wherein the location of the target area is shifted within the imaged image in the detected direction;
recognizing an object in the imaged image; and
superposing, on the imaged image, a display form of the information related to the recognized object existing in the target area and an display form of the information related to the recognized object existing outside the target area as respectively different display forms,
wherein, in a case where the speed detected is equal to or lower than a first threshold value, the determining determines the target area as a first area which is near the center, and, in a case where the speed detected exceeds the first threshold value, the determining determines the target area as a second area which is shifted within the imaging target in the detected movement direction, and
wherein, in a case where a ratio of the objects existing in the imaged image does not exceed a threshold value, the detecting does not measure the movement direction and the speed, the determining determines the whole imaged image as the target area, the recognition unit recognizes the objects being recognizable in the imaged image, and the superposing superposes, on the imaged image, the information related to the recognized objects in the imaged image.

15. A non-transitory computer-readable storage medium which stores a computer-executable program to achieve a control method for an information display apparatus which superposes information on an imaged image of a client apparatus and displays them, the control method comprising:
detecting, by a sensor, a direction in which the in-imaging client apparatus is moved relative to an imaging target;
determining a location of a target area within the imaged image based on the detected direction, wherein the location of the target area is shifted within the imaged image in the detected direction;
recognizing an object in the imaged image; and
superposing, on the imaged image, the information related to the object existing in the target area, and not superposing, on the imaged image, the information related to the object existing outside the target area,
wherein, in a case where a ratio of the objects existing in the imaged image does not exceed a threshold value,
the detecting does not measure the movement direction,
the determining determines the whole imaged image as the target area,
the recognizing recognizes the objects recognizable in the imaged image, and
the superposing superposes, on the imaged image, the information related to the recognized objects in the imaged image.

16. A non-transitory computer-readable storage medium which stores a computer-executable program to achieve a control method for an information display apparatus which superposes information on an imaged image of a client apparatus and displays them, the method comprising:
detecting a direction in which the in-imaging client apparatus is moved relative to an imaging target and a speed of movement of the imaged image;
determining a location of a target area within the imaged image based on the detected direction, wherein the location of the target area is shifted within the imaged image in the detected direction;
recognizing an object in the imaged image; and
superposing, on the imaged image, a display form of the information related to the recognized object existing in the target area and an display form of the information related to the recognized object existing outside the target area as respectively different display forms,
wherein, in a case where the speed detected is equal to or lower than a first threshold value, the determining determines the target area as a first area which is near the center, and, in a case where the speed detected exceeds the first threshold value, the determining determines the target area as a second area which is shifted within the imaging target in the detected movement direction, and
wherein, in a case where a ratio of the objects existing in the imaged image does not exceed a threshold value, the detecting does not measure the movement direction and the speed, the determining determines the whole imaged image as the target area, the recognition unit recognizes the objects being recognizable in the imaged image, and the superposing superposes, on the imaged image, the information related to the recognized objects in the imaged image.

* * * * *